United States Patent

French

[11] Patent Number: 5,647,736
[45] Date of Patent: Jul. 15, 1997

[54] PUMP SHROUD APPARATUS FOR PORTABLE SPAS

[75] Inventor: Robin A. French, Fallbrook, Calif.

[73] Assignee: Watkins Manufacturing Corp., Vista, Calif.

[21] Appl. No.: 366,491

[22] Filed: Dec. 30, 1994

[51] Int. Cl.[6] .................................................. F04B 17/03
[52] U.S. Cl. ............................................... 417/423.14
[58] Field of Search ........................... 417/423.8, 423.14; 310/57, 58, 59

[56] References Cited

U.S. PATENT DOCUMENTS

| | | | |
|---|---|---|---|
| 1,487,766 | 3/1924 | Sutcliffe | 310/58 |
| 2,210,692 | 8/1940 | Stokes | 310/58 |
| 3,051,856 | 8/1962 | Hanschitz | 310/59 |
| 3,250,926 | 5/1966 | O'Reilly et al. | 310/59 |
| 3,739,207 | 6/1973 | Keilmann et al. | 310/59 |
| 5,065,058 | 11/1991 | Ferguson et al. | 310/59 |

Primary Examiner—Timothy Thorpe
Assistant Examiner—Peter G. Korytnyk
Attorney, Agent, or Firm—Price, Gess & Ubell

[57] ABSTRACT

A water jet circulation pump is fitted with a pump shroud having a collector portion for collecting exhaust from a pump vent and conducting the exhaust to an exhaust port. In one embodiment, the collector portion is U-shaped and fits over the motor venting and flush against a curved portion of the motor. Another embodiment includes a body portion comprising a cylinder open at one end and closed at an opposite end by an end face, the end face having an opening about which an exhaust port is formed.

12 Claims, 8 Drawing Sheets

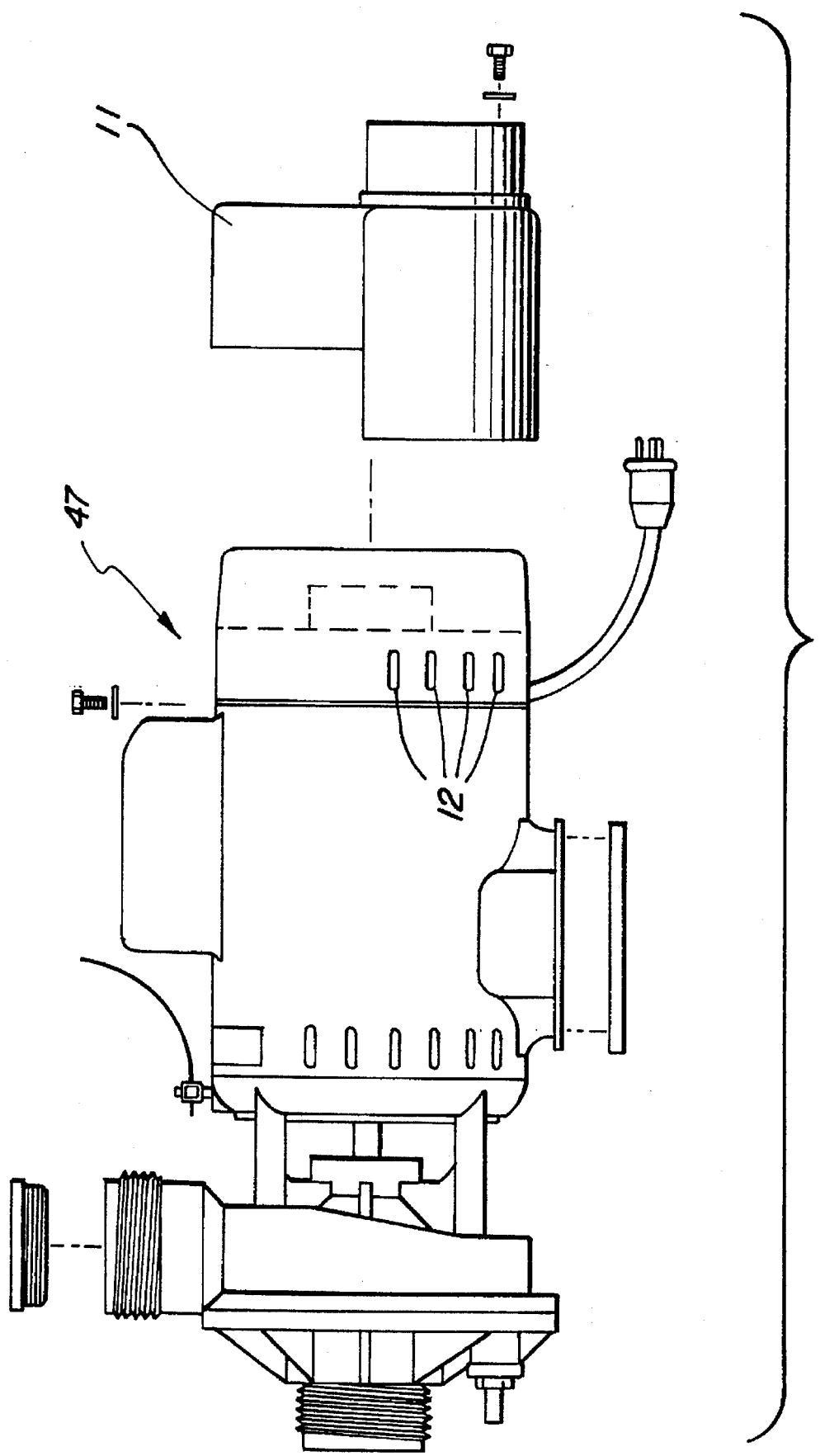

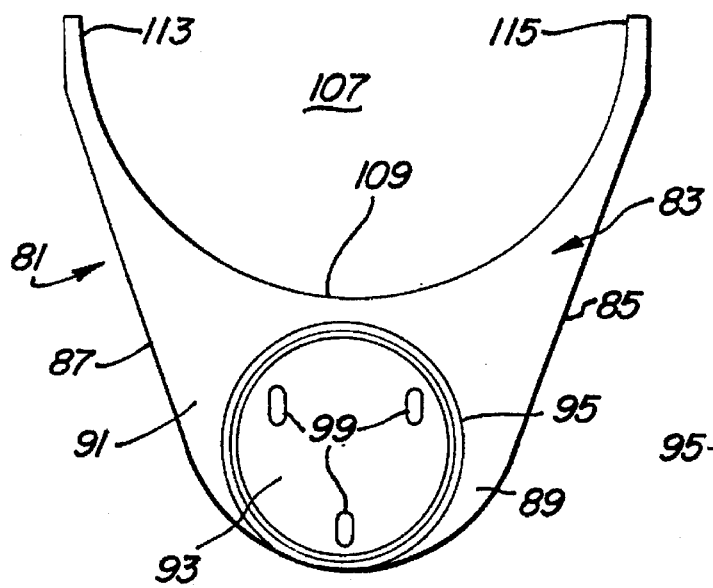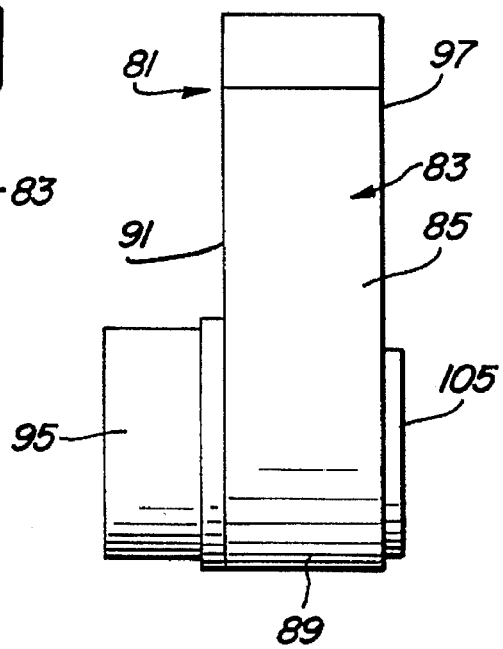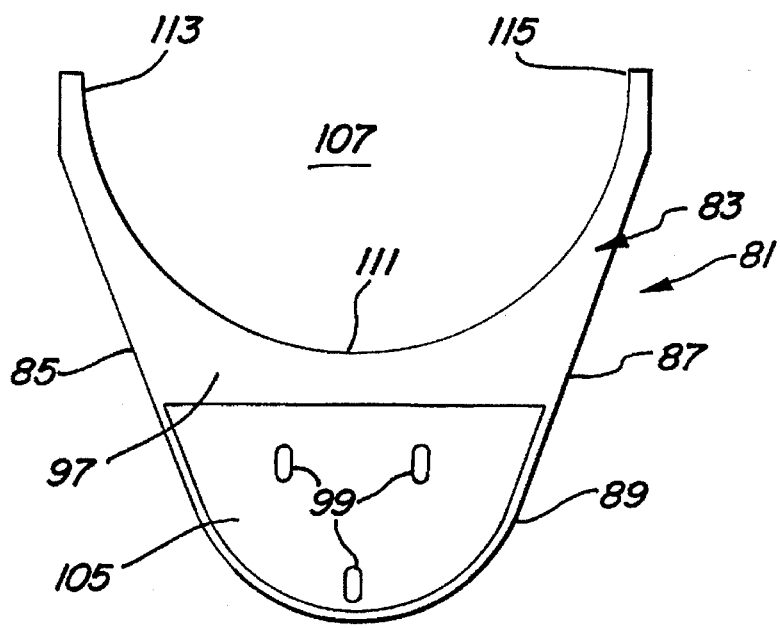

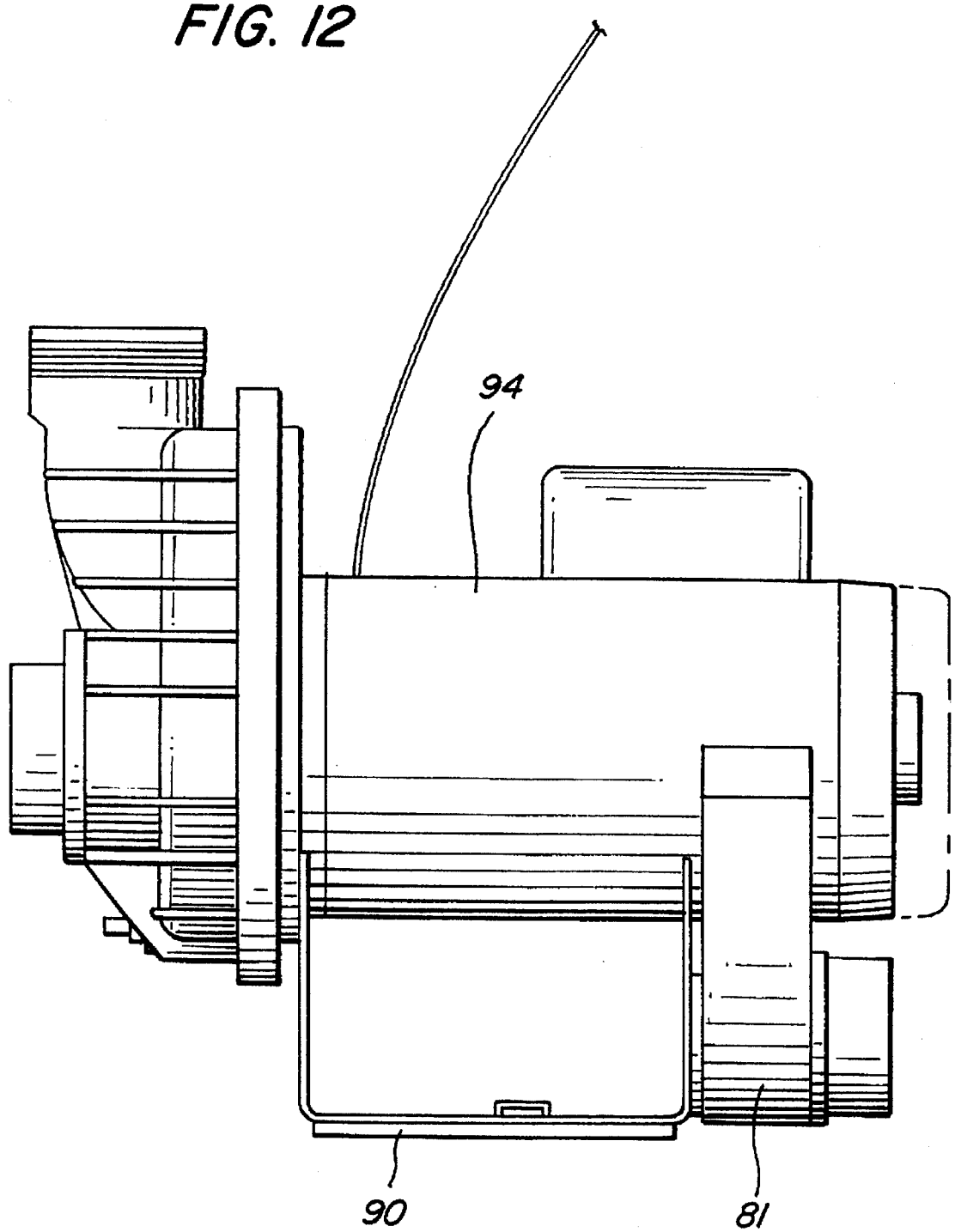

5,647,736

PUMP SHROUD APPARATUS FOR PORTABLE SPAS

BACKGROUND OF THE INVENTION

1. Field of the Invention

The subject invention relates generally to portable spas and, more particularly, to pump shroud apparatus for dissipating heat generated by water circulating and jet pumps located in the equipment area of such spas

2. Description of Related Art

Conventional portable spa units are known wherein each spa contains its own concealed equipment compartment housing various items of spa equipment such as heater apparatus, water circulation and jet pumps, filters, and electrical componentry. The desire to provide a spa which is compact and, hence, portable, provides a motivation to reduce the space occupied by such compartments within the general contour of the spa. Such equipment compartments have in the past been required to house as many as two water jet pumps in a so-called two-pump system. Such pumps generate a considerable amount of heat which can cause the temperature in the vicinity of electrical componentry to reach the design threshold of such componentry, for example, in the range of 60° to 65° C. Such heating can cause nuisance tripping of thermal contacts, overheating of pump motors, and adverse effects on the life and performance of various componentry. Such problems have increased as manufacturers have "asked" jet pumps to draw more and more amps in smaller and smaller compartments. Conventional vents, e.g., provided on the equipment compartment doors or other spa surfaces, have proved insufficient to avoid such problems.

OBJECTS AND SUMMARY OF THE INVENTION

It is therefore an object of the invention to improve portable spa apparatus;

It is another object of the invention to eliminate the deleterious effects of heat produced by water jet pumps located in internal equipment compartments of spas;

It is another object of the invention to provide apparatus for eliminating the effects of heat in such equipment compartments, which apparatus is relatively easy to fabricate, use, and install, and which does not detract from the outward appearance of the spa or occupy significant additional space within the equipment compartment.

These and other objects are accomplished according to the invention by providing apparatus which gathers the cooling air exhaust stream generated by water jet pump motors directly at the pump motor exhaust ports and thereafter directs the heated exhaust directly out of the equipment compartment and spa to ambient surroundings. This apparatus includes a shroud component mountable on the jet pump and having a means to collect and direct air currents generated during operation of the water jet pump.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings of which:

FIG. 6 is a side view illustrating installation of the shroud of FIG. 1 on a circulation pump;

FIG. 8 is a front view of a second pump shroud embodiment;

FIG. 9 is a rear view of the pump shroud embodiment of FIG. 8;

FIG. 10 is a side view of the pump shroud embodiment of FIG. 8;

FIG. 12 illustrates the shroud of FIGS. 8–10 installed;

DETAILED DESCRIPTION OF THE PREFERRED EMBODIMENTS

Figure 4:
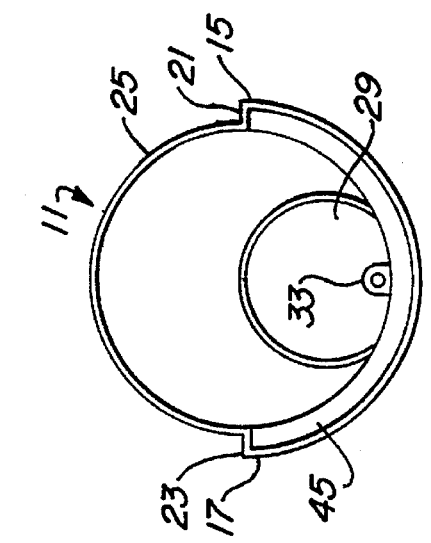
FIG. 4 is a back view of the shroud of FIG. 1.
Figure 5:
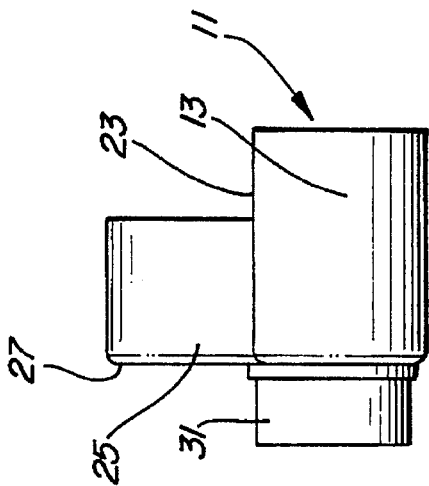
FIG. 5 is a side view of the shroud of FIG. 1.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide pump shroud apparatus particularly adapted for use with a variety of pumps and which are relatively inexpensive to manufacture and easy to install.

Typical conventional water jet pumps circulate air through the pump motor housing to cool the motor. Such air is typically exhausted through ducts or vents, e.g., in an end cap or bell housing of the motor. Typical vents 12 are shown in FIG. 6.

According to the preferred embodiments, a pump shroud component is designed to mount on the motor over the motor's exhaust air vent or duct in order to collect heated exhaust air and conduct it away from the motor, through a suitable flexible conduit or hose, and out of the side of the spa. The pump shroud components are generally shaped to fit flush with and conform to the motor shape in order to collect the exhaust air and prevent its escape. Various models may snap-fit onto the circulation pump motor or be designed to attach to the motor by screws or other conventional fastening means.

A first pump shroud embodiment 11 is illustrated in FIGS. 1–5. The shroud 11 includes a lower collector section 13 which is a section of a cylinder and, hence, appears semi-circular in cross-section and in the end view of FIG. 4. The collector section 13 terminates at its respective upper ends 15, 17 in inwardly-turned horizontal edges 21, 23. Each edge 21, 23 extends an equal distance and then abuts against an end cap 25, which is cylindrical and, closed at one end by a generally flat, circular end surface 27. The end surface 27 is a generally flat, continuous surface with the exception of a circular opening 29 at the lower end thereof about which a cylindrical exhaust port 31 of circular cross-section is formed.

Figure 3:
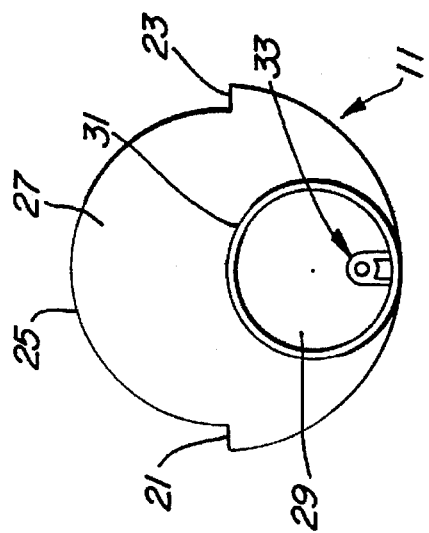
FIG. 3 is a front view of the shroud of FIG. 1.
Figure 1:
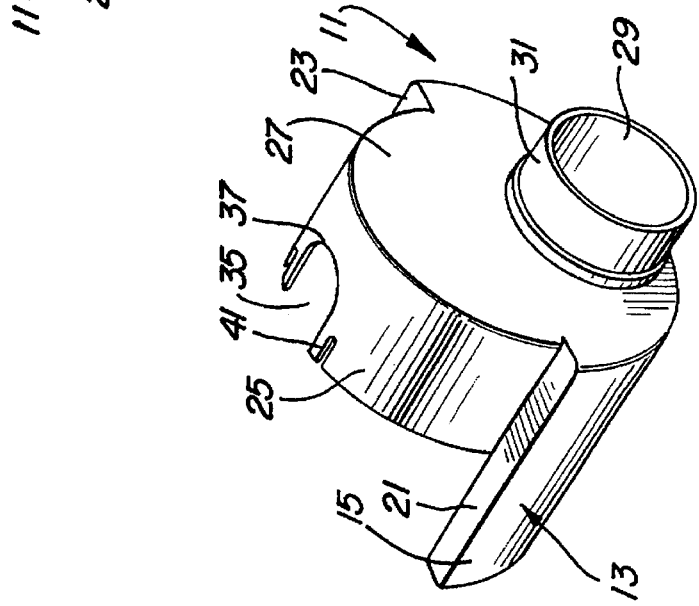
FIG. 1 is a perspective view of a first pump shroud embodiment according to the invention.

As may be seen in FIG. 3, a screw boss 33 is mounted on the floor of the pump shroud 11 so as to face the opening 29 defining the entrance to the cylindrical exhaust port 31. This provides a structural support and screw guide to align with existing attachment ports provided with water jet pump housings.

Figure 2:
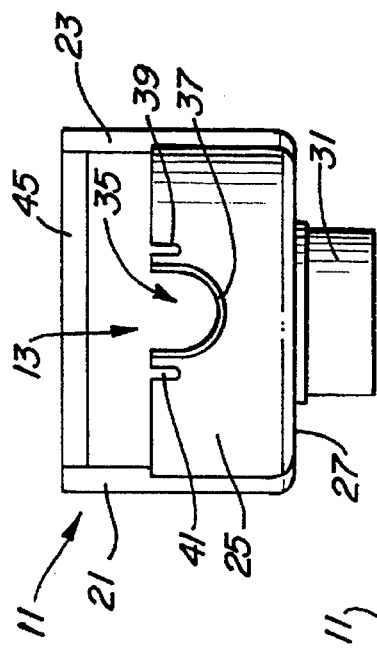
FIG. 2 is a top view of the shroud of FIG. 1.

As shown in FIG. 2, an oblong cutout 35 having a circular end portion 37 is formed in the top of the end cap 25. Two notches 39, 41 are also formed in the top of the end cap 25, one on either side of the cutout 35. These notches 39, 41 are positioned and sized to slide under, and be held captive by, water jet pump capacitor housing hardware. This, plus screw boss 33 (FIG. 3), provides for mounting on an existing NEMA housing without modification. The pump shroud 11 is preferably a unitary part, formed by injection molding of a plastic material such as high temperature ABS or PVC.

Finally, a semicircular rubber sealing ring 45 is glued or otherwise attached in the end of the collector section 13 so as to extend around the entire periphery thereof. The ring 45 is of the same width as the edges 21, 23 and has respective ends which abut one of those edges 21, 23.

Figure 7:
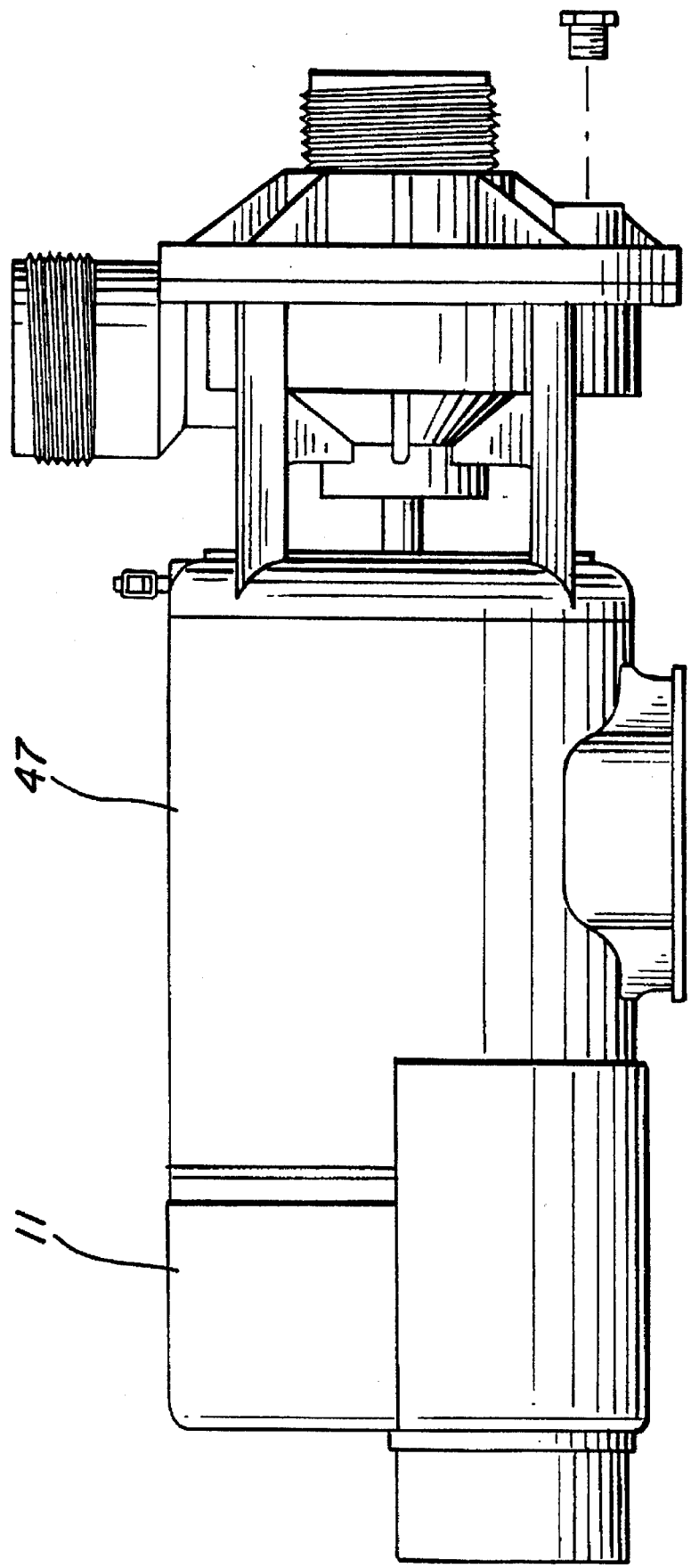
FIG. 7 is a side view illustrating an installed shroud embodiment.

FIG. 6 illustrates the mounting of the pump shroud 11 on a circulation pump 47, such as a "48" frame, Wavemaster 5000 model pump, or any pump and motor designed to NEMA standards: FIG. 7 shows the shroud 11 installed No modifications are required to the pump. The shroud is designed to fit the specific pump.

Figure 11B:
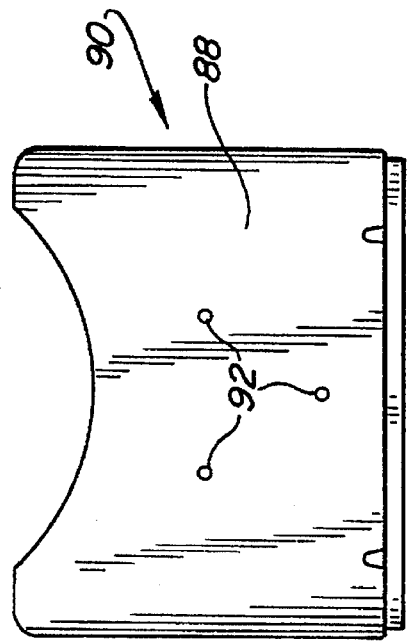
FIGS. 11A-D illustrate a pump shroud frame.
Figure 11D:
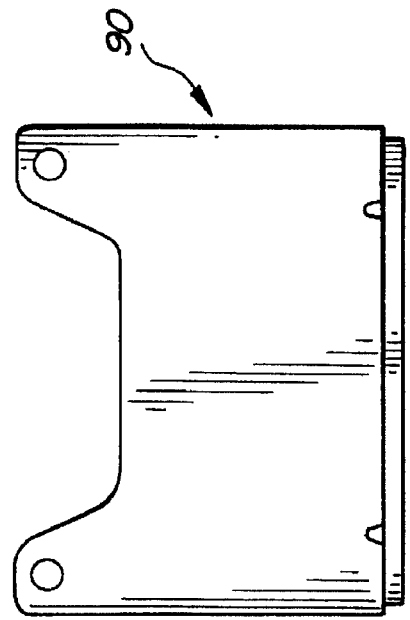
Figure 11A:
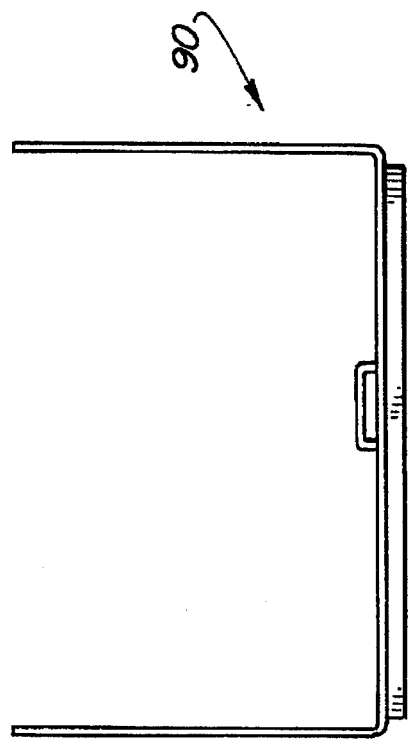
Figure 11C:
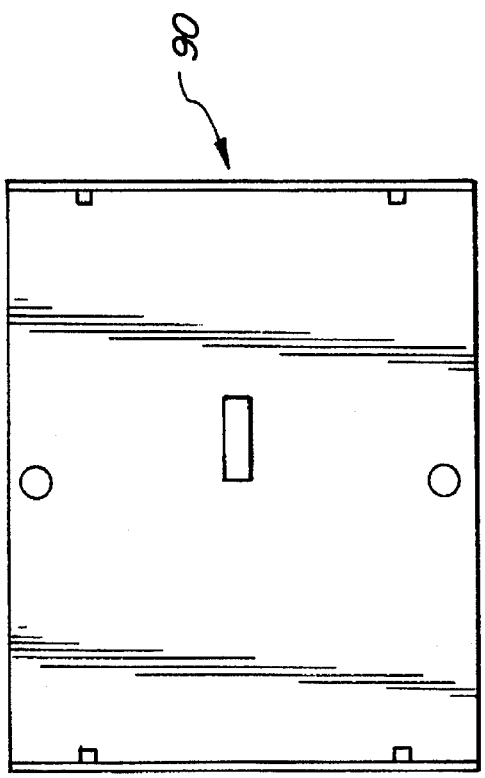

FIGS. 8–10 illustrate a second pump shroud embodiment 81 designed to cooperate with another water circulation pump model, Model No. 56 frame, Wavemaster 5000. The pump shroud 81 includes a collector 83 having first and second side walls 85, 87 which extend inwardly and integrally form into a rounded bottom portion 89. The front face 91 of the pump shroud 81 has a circular opening 93 therein from which a cylindrical exhaust port 95 extends. The back face 97 of the pump shroud 81 has three openings 99 therein. A semicircular piece of elastic foam padding 105 is attached to the back face 97 and is cut out at three locations to expose the openings 99. The foam padding 105 seals the unit against the face 88 of the pump shroud frame 90 shown in FIG. 11B. Openings 99 are screw clearance holes which mate with holes 92 of FIG. 11B.

As may be seen, a generally U-shaped opening 107 is provided at the upper portion of the shroud 81 and is formed by the parallel upper edges 109, 111 of the respective front and back faces 91, 97. A rubber seal is placed continuously around these edges 109, 111 and across the upper edges 113, 115 of the sides 85, 87.

The U-shaped opening 107 is shaped to conformably abut the underside of the corresponding pump motor 94 (FIG. 12) such that edges 109, 111 lie on either side of exhaust vents in the motor 94. In this manner all of the heated exhaust air from the motor 94 is collected by the shroud 81 and directed out the exhaust port 95.

Figure 13:
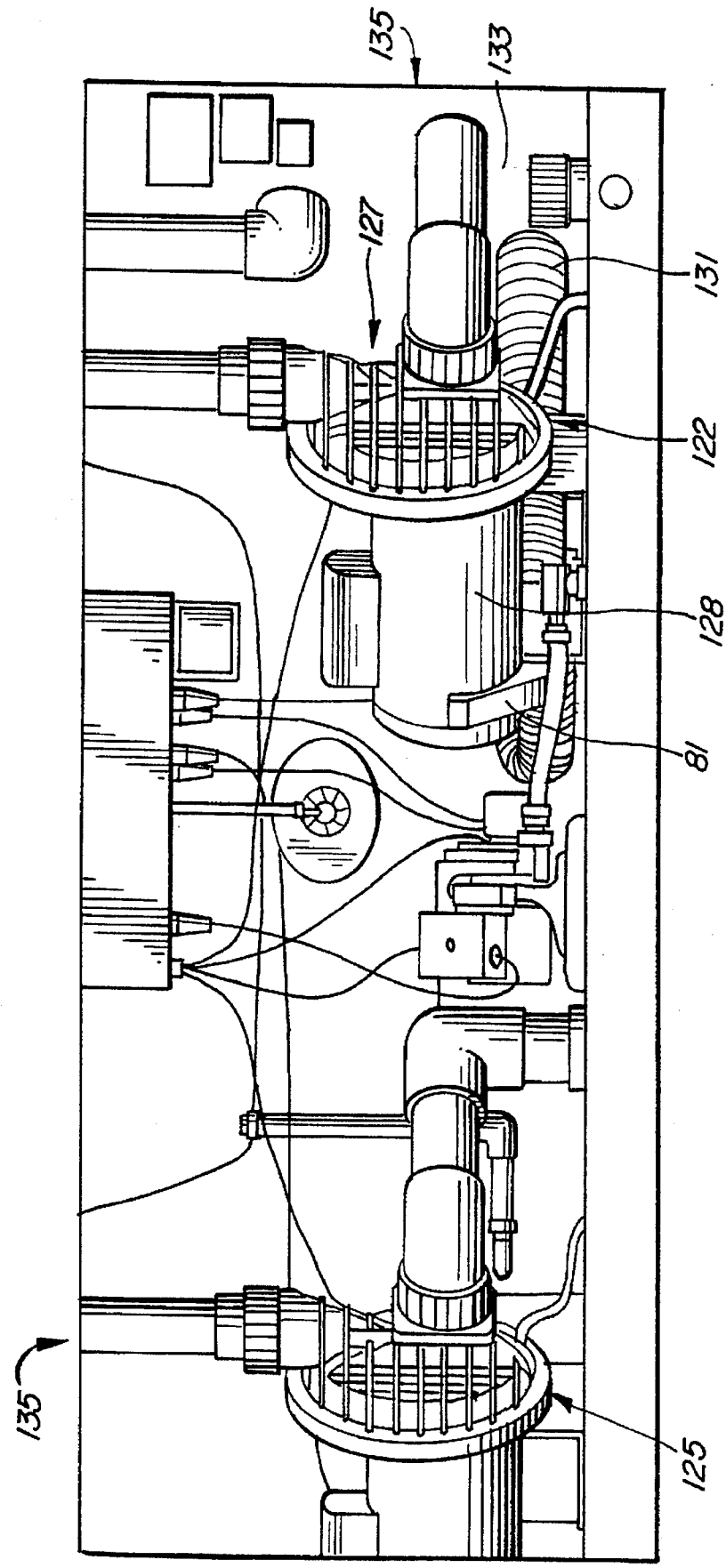
FIG. 13 is a schematic side view of a typical two-pump equipment compartment illustrating circulation pump heat exhaust apparatus according to a preferred embodiment.

FIG. 13 illustrates a pair of circulation pumps 125, 127 in the equipment compartment of a portable spa unit 135. A shroud 81 is shown attached into a base, (FIG. 11A–11D), through holes 99, (FIG. 7), to the motor 128 of the pump 127. A flexible exhaust hose 131 is shown, fixed about the exhaust port 95 of the shroud 81, e.g., by a suitable hose clamp. The flexible exhaust hose 131 curves around and extends to the inner wall 133 of the spa unit 135, where an opening is established to vent the exhaust air from the motor 127 to the exterior of the spa unit 135. Such an opening may be conveniently concealed by exterior spa skirting so as to achieve exhaust air venting while presenting a pleasant exterior appearance and while protecting electrical componentry of the spa control panel from deleterious effects of heat.

In an application such as shown in FIG. 13, it is possible to reduce the temperature of the equipment compartment by as much as 28° F. through application of exhaust shroud apparatus according to the invention. In addition, motor and electronics life is enhanced, as well as the overall reliability of the spa. As may be appreciated, various circulation pump orientations can be accommodated by the approach of the preferred embodiment—another significant advantage.

Figure 14:
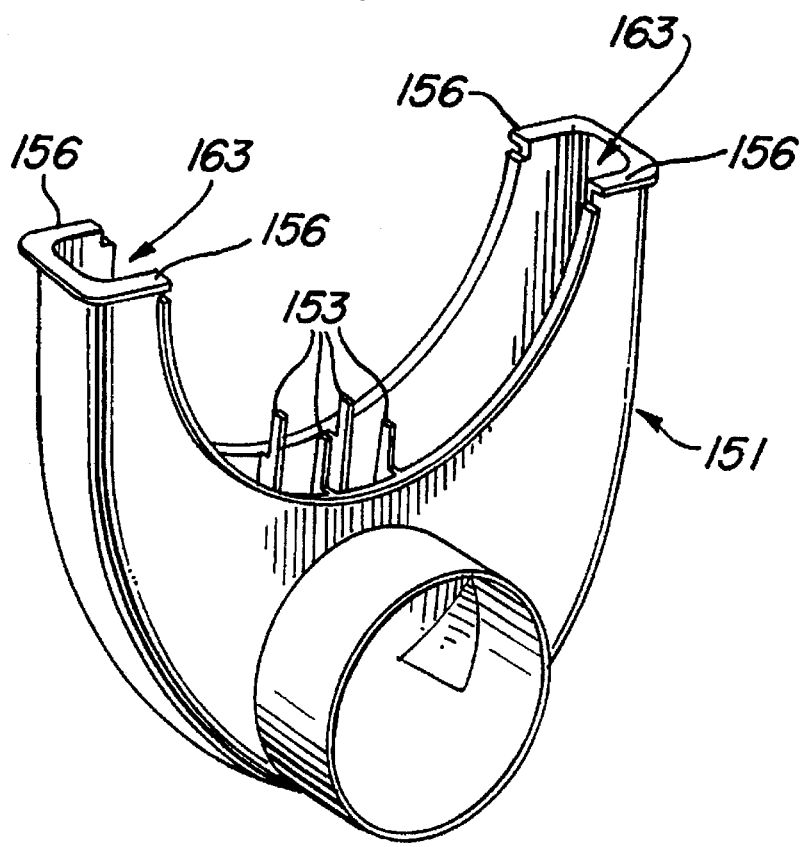
FIG. 14 is a perspective view of another pump shroud embodiment.
Figure 15:
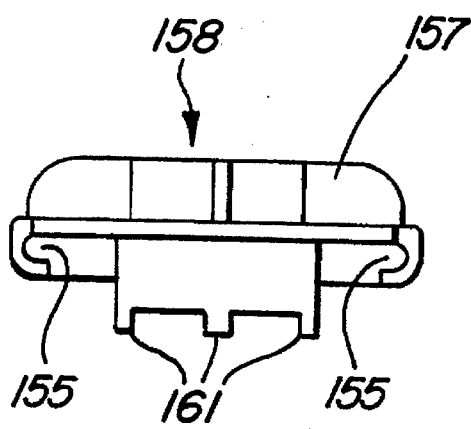
FIG. 15 is a front view of an alignment clip usable with the embodiment of FIG. 14.
Figure 16:
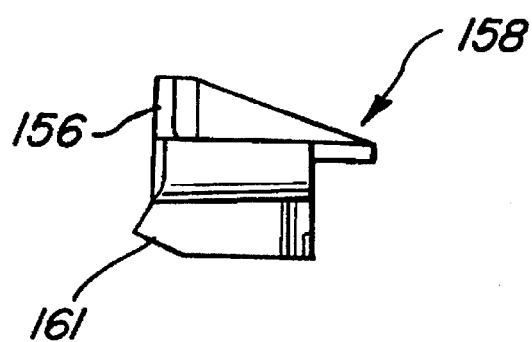
FIG. 16 is a side view of the clip of FIG. 15.

FIG. 14 illustrates another pump shroud embodiment 151 wherein prongs 153 serve to align the shroud 151 with a cooperating pump apparatus. Alignment clips 158 (FIGS. 15–16) have curved channels 155 which slide on parallel rims 156 of the shroud 151 and assist to align and fix the shroud in position via extended tabs 161, three equally spaced and parallel aligned tabs 161 being provided in the particular illustrative embodiment. The clips 158 also close the open ends 163 of the shroud 151.

Thus, according to the various embodiments, a pump shroud is attached to the back end of the jet pump of a spa unit and evacuates excess heat from the equipment area. The shroud eliminates the need for a vent on the equipment compartment door (which makes for quieter operation), eliminates the possibility of overheating pump motors, and protects all other components from excessive heat.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A pump shroud for use with an electric motor, the electric motor having an exhaust vent through which heated air is expelled from the electric motor, the pump shroud comprising:

accepting means for accepting the heated air directly from the exhaust vent of the electric motor, said accepting means including contacting means for contacting a portion of the electric motor near the exhaust vent and surrounding said exhaust vent, said contacting means further having a U-shape and fitting flush against a curved portion of the electric motor; and routing means connected to the accepting means for routing the accepted heated air from the exhaust vent of the electric motor away from the electric motor in order to reduce the temperature of air around the electric motor.

2. The pump shroud according to claim 1, wherein the contacting means comprises sealing means for creating a seal between the portion of the electric motor and the contacting means.

3. The pump shroud according to claim 1, further comprising securing means for securing the pump shroud to the electric motor.

4. The pump shroud according to claim 1, wherein the pump shroud comprises injection molded plastic.

5. A pump shroud for use with an electric motor, the electric motor having an exhaust vent through which heated air is expelled from the electric motor, the pump shroud comprising:

a pump shroud body including contacting means having a U-shape for fitting flush against a cylindrical portion of the electric motor near the exhaust vent and evacuating means for fitting over said exhaust vent, for collecting the heated air expelled from the electric motor and for evacuating the collected heated air away from the exhaust vent; and securing means for securing the pump shroud body to the electric motor.

6. The pump shroud according to claim 5 wherein the contacting means creates a seal between the electric motor and the contacting means.

7. The pump shroud according to claim 5, wherein the pump shroud comprises injection molded plastic.

8. A pump shroud comprising:

a collector body having first and second side walls, each extending downwardly and inwardly to integrally form into a rounded bottom, said collector body having a front face and an opening shaped to conformably abut the underside of a cooperating pump motor;

a circular opening in said front face; and a cylindrical exhaust port extending from said front face and located about said opening.

9. The pump shroud of claim 5 wherein said opening is generally U-shaped.

10. A pump shroud comprising:

a lower collector section comprising a half cylinder terminating at respective upper ends in inwardly-turned horizontal planar edges, each planar edge extending an equal length and then abutting an end cap, said end cap comprising a cylinder open at one end and closed at an opposite end by a generally flat circular end face, said end face having a circular opening at the lower end thereof about which a cylindrical exhaust port of circular cross-section is formed, the cylindrical exhaust port having a diameter smaller than that of the cylinder forming said end cap.

11. A pump shroud comprising:

a body portion comprising a cylinder, said cylinder being open at one end and closed at an opposite end by an end face, said end face having an opening therein, said opening being smaller in size than the open end of said cylinder;

an exhaust port formed about said opening; and means for facilitating attachment of said body portion to a pump motor.

12. The pump shroud of claim 11 wherein said exhaust port is cylindrical and wherein the diameter of said exhaust port is equal to or less than one-half that of said cylinder.

* * * * *